(12) United States Patent
Wang et al.

(10) Patent No.: US 10,583,804 B2
(45) Date of Patent: Mar. 10, 2020

(54) GUIDE RING SENSOR

(71) Applicant: Liang-Hsiung Wang, Tainan (TW)

(72) Inventors: Liang-Hsiung Wang, Tainan (TW);
Chia-Chun Chu, Tainan (TW)

(73) Assignee: Liang-Hsiung Wang, Tainan (TW)

( * ) Notice: Subject to any disclaimer, the term of this patent is extended or adjusted under 35 U.S.C. 154(b) by 174 days.

(21) Appl. No.: 15/958,361

(22) Filed: Apr. 20, 2018

(65) Prior Publication Data

US 2018/0304850 A1  Oct. 25, 2018

(30) Foreign Application Priority Data

Apr. 24, 2017  (TW) .............................. 106113639 A (51) Int. Cl.
*B60R 22/19* (2006.01)
*B60R 22/48* (2006.01)
*B60R 22/18* (2006.01)

(52) U.S. Cl.
CPC .............. *B60R 22/19* (2013.01); *B60R 22/48* (2013.01); *B60R 2022/1806* (2013.01); *B60R 2022/1818* (2013.01); *B60R 2022/485* (2013.01); *B60R 2022/4816* (2013.01)

(58) Field of Classification Search
CPC ..... B60R 22/19; B60R 22/48; B60R 2022/48; B60R 2022/4816; B60R 2022/485; B60R 2022/1806; B60R 2022/1818
See application file for complete search history.

(56) References Cited

U.S. PATENT DOCUMENTS

| 4,511,097 | A | * | 4/1985 | Tsuge | B60R 22/44 180/268 |
| 5,732,974 | A | * | 3/1998 | Sayles | B60R 22/18 280/805 |
| 6,340,209 | B1 | * | 1/2002 | Yamamoto | B60R 22/26 297/478 |
| 2004/0232670 | A1 | * | 11/2004 | Devereaux | B60R 22/18 280/735 |
| 2006/0012236 | A1 | * | 1/2006 | Kock | B60R 22/48 297/469 |
| 2018/0304850 | A1 | * | 10/2018 | Wang | B60R 22/19 |

FOREIGN PATENT DOCUMENTS

| JP | 58185350 A | * | 10/1983 | ............. B60R 22/44 |
| JP | 2003175796 A | * | 6/2003 | |
| WO | WO-2011053011 A2 | * | 5/2011 | ............. B60R 22/48 |
| WO | WO-2011053015 A2 | * | 5/2011 | ......... A44B 11/2569 |

* cited by examiner

*Primary Examiner* — James A English
(74) *Attorney, Agent, or Firm* — Muncy, Geissler, Olds & Lowe, P.C.

(57) ABSTRACT

A guide ring sensor has a fixing seat, a guide ring, an elastic member, and a sensing element. The guide ring is pivoted on the fixing seat by a positioning member. The elastic member is mounted on the body of the fixing seat, is connected to the guide ring, and provides resilience to the guide ring. The sensing element is mounted on the fixing seat to detect a pivoting angle change of the guide ring and generate a signal corresponding to the pivoting angle change of the guide ring. The sensing element may detect whether a webbing is correctly fastened or not by the pivoting angle change of the guide ring.

20 Claims, 9 Drawing Sheets

GUIDE RING SENSOR

CROSS-REFERENCE TO RELATED APPLICATIONS

This application is based upon and claims priority under 35 U.S.C. 119 from Taiwan Patent Application No. 106113639 filed on Apr. 24, 2017, which is hereby specifically incorporated herein by this reference thereto.

BACKGROUND OF THE INVENTION

1. Field of the Invention

The present invention relates to a guide ring sensor, and more particularly to a guide ring sensor that is mounted in a vehicle for a webbing of a seat belt mechanism to pass through and detect whether the webbing of the seat belt mechanism is fastened or not.

2. Description of Related Art

A conventional seat belt mechanism in a vehicle is a three-point seat belt mechanism. If the conventional seat belt mechanism is used incorrectly by the driver or the passengers in the vehicle, the driver or the passengers may be injured in emergency. With the ever increasing awareness on vehicle safety, a sensing device has been a necessary safety device in the vehicle for detecting whether the webbing of the seat belt mechanism is fastened or not.

The sensing device is used to detect whether the webbing of the conventional seat belt mechanism is fastened or not and is mounted in a seat belt buckle of the conventional seat belt mechanism. The sensing device detects whether a tongue of the conventional seat belt mechanism is inserted into a seat belt buckle of the conventional seat belt mechanism. When the tongue is not inserted into the seat belt buckle, the sensing device generates and sends a signal to an alarm system in the vehicle, and the alarm system generates a warning signal such as a warning sound or a warning light to remind the driver or the passengers seated in the vehicle to fasten the webbing.

Although the sensing device may accomplish the predetermined sensing function, some drivers or passengers, for convenience or for dislike of binding by the webbing of the conventional seat belt mechanism, may use an auxiliary tongue for inserting into the seat belt buckle, or may have the webbing pass through the rear side of the torso instead of the front side of the torso. Then, the tongue mounted on the webbing is inserted into the seat belt buckle, leading to misjudgment of the sensing device. Though the drivers or passengers do not actually fasten the seat belts, the sensing device does not send the warning signal to the alarm system of the vehicle. Therefore, the reminding function of the sensing device mounted in the seat belt buckle is not effectively performed.

To overcome the shortcomings, the present invention provides a guide ring sensor to mitigate or obviate the aforementioned problems.

SUMMARY OF THE INVENTION

The objective of the invention is to provide a guide ring sensor to resolve the misjudgment caused by false fastening of the webbing that hinders the reminding function of the sensing device.

The guide ring sensor has a fixing seat, a guide ring, an elastic member, and a sensing element. The fixing seat has a body, a connecting plate, and a positioning hole. The body has a front surface, a first end, and a second end. The first end and the second end of the body are formed on the front surface of the body and are opposite each other. The connecting plate is mounted on the first end of the body. The positioning hole is formed through the body adjacent to the second end of the body. The guide ring is pivoted on the fixing seat by a positioning member and has an upper section, a lower section, a pivot hole, and a slot. The lower section is deposited below the upper section of the guide ring. The pivot hole is formed through the upper section of the guide ring. The slot is formed through the lower section of the guide ring. The pivot hole of the guide ring is deposited above the slot of the guide ring. The positioning member is inserted through the pivot hole of the guide ring and the positioning hole of the body. The guide ring is rotatably mounted on the fixing seat. The elastic member is mounted on the body of the fixing seat and is connected to the guide ring. The elastic member provides resilience to the guide ring. The sensing element is mounted on the connecting plate of the fixing seat and has a sensing portion. The sensing portion detects a pivoting angle change of the guide ring, and the sensing element generates a signal corresponding to the pivoting angle change of the guide ring.

The guide ring sensor further has a shell. The shell is mounted outside and around the fixing seat, the guide ring, the elastic member, and the sensing element. The shell has a bottom surface, a rear surface, an activity space, and an opening. The activity space is formed in the shell. The opening is formed on the bottom surface of the shell and communicates with the activity space. The lower section of the guide ring extends out of the opening of the shell and is freely moveable, and the positioning member is inserted out of the rear surface of the shell.

The guide ring sensor can be adapted to a seat belt mechanism in a vehicle and has the following advantages:

1. Promote the reliability of a seat belt in use: the sensing element and the guide ring are combined for directly mounting on a predetermined mounting location for the guide ring in the vehicle and are electrically connected to an alarm system in the vehicle. The pivoting angle of the guide ring is detected to judge whether the driver or the passengers in the vehicle correctly use a seat belt mechanism or not, and then the guide ring sensor may cooperate with the alarm system in the vehicle. When the driver or any one of the passengers does not fasten a webbing of the seat belt, this invention makes the driver or the passenger hard to avoid triggering the alarm system or restrain a system function by means of inserting an auxiliary tongue into a seat belt buckle or by not passing the webbing through the front side of the torso of the driver or passenger. When the driver or the passengers fasten the webbing correctly, the guide ring is pulled by an oblique tension provided by the webbing, and the guide ring is rotated to escape a detection range of the sensing element for stopping a warning sound of the alarm system or recovering the system function. Therefore, the guide ring sensor may promote the reliability of the seat belt in use.

2. Simple structure and easy assembly: a structure of the guide ring sensor is simple and the assembly of the fixing seat, the guide ring, the elastic member, the sensing element, and the shell is easy. The guide ring sensor may be directly mounted on the predetermined mounting location for the guide ring in the vehicle and be electrically connected to the alarm system in the vehicle. The guide ring sensor is easy to assemble. The guide ring sensor may be mounted on the vehicle during manufacture prior to shipping. Or the guide ring sensor may be mounted by users themselves.

3. The guide ring sensor may be suitable for both the left and right seats in the vehicle: the guide ring sensor may be directly mounted on the predetermined mounting location for the guide ring in the vehicle. The guide ring sensor may be suitable for the left and right seats in the vehicle.

Other objectives, advantages and novel features of the invention will become more apparent from the following detailed description when taken in conjunction with the accompanying drawings.

DETAILED DESCRIPTION OF THE PREFERRED EMBODIMENT

With reference to FIGS. 1, 2, 5, and 6, a first embodiment, a second embodiment, a third embodiment, and a fourth embodiment of a guide ring sensor 1A, 1B in accordance with the present invention comprises a fixing seat 10A, 10B, a guide ring 20, an elastic member 30, and a sensing element 40. The guide ring sensor 1A, 1B further has a shell 50A, 50B.

Figure 1:
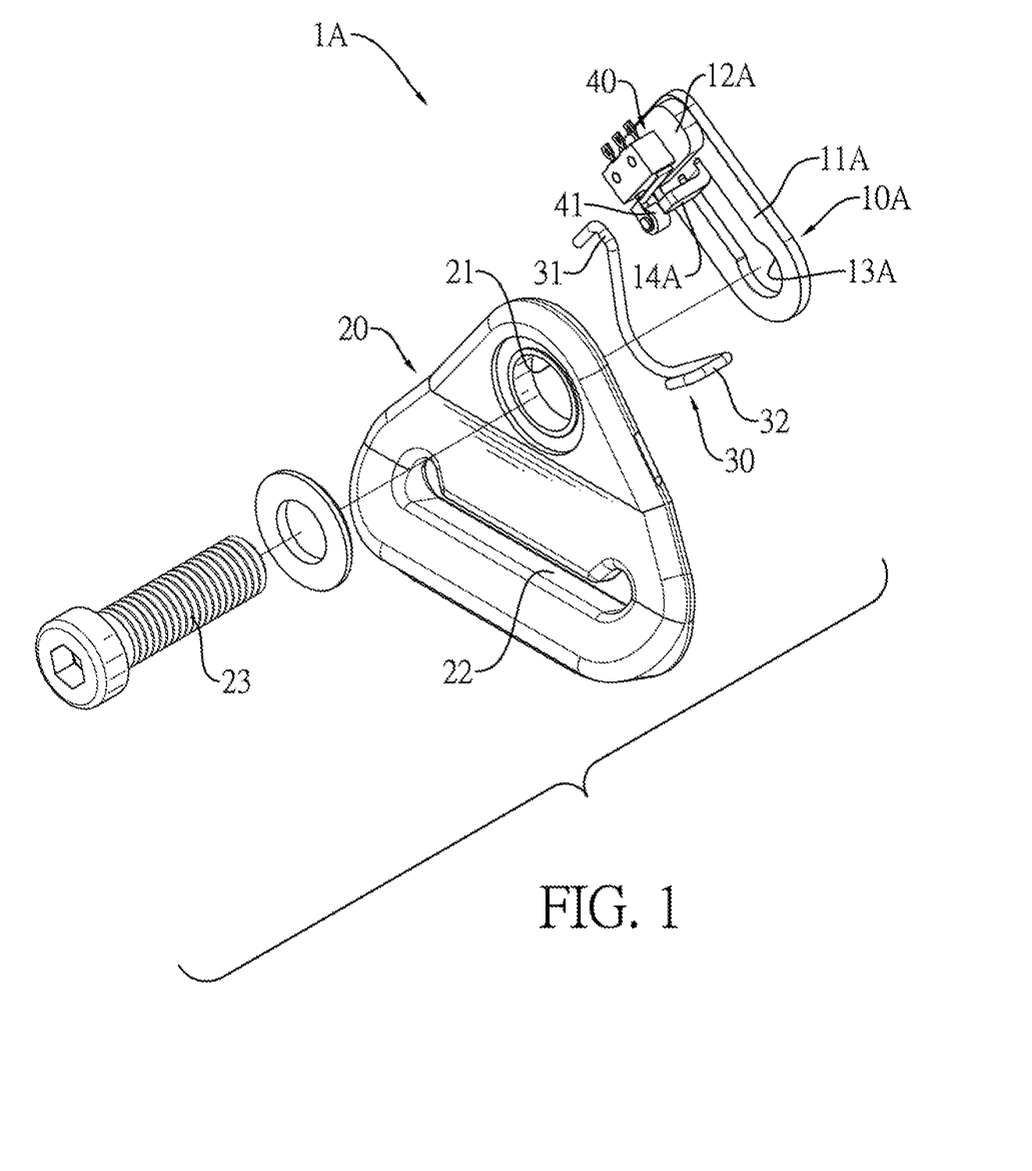
FIG. 1 is an exploded perspective view of a first embodiment of a guide ring sensor in accordance with the present invention.
Figure 5:
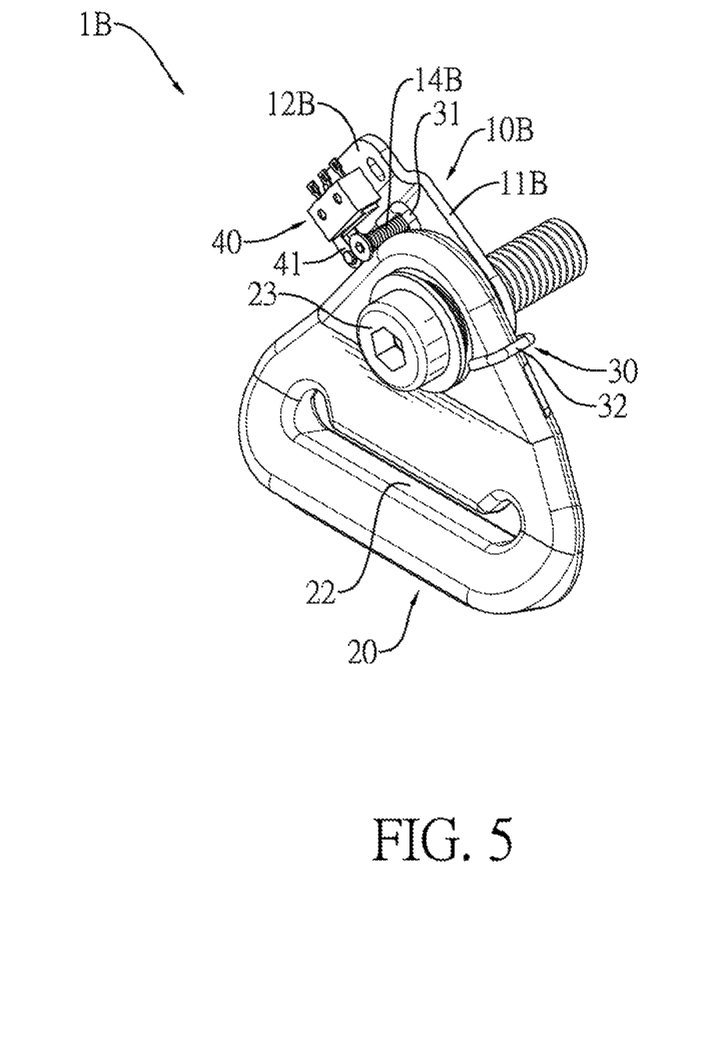
FIG. 5 is a perspective view of a third embodiment of a guide ring sensor in accordance with the present invention.

With reference to FIG. 1, FIGS. 2 to 4, FIG. 5, and FIGS. 6 and 7, the fixing seat 10A, 10B has a body 11A, 11B, a connecting plate 12A, 12B, and a positioning hole 13A, 13B. The body 11A, 11B has a front surface, a first end, and a second end. The first end and the second end of the body 11A, 11B are formed on the front surface of the body 11A, 11B and opposite each other. The connecting plate 12A, 12B is mounted on the first end of the body 11A, 11B. With reference to FIGS. 1 and 5, the positioning hole 13A, 13B is formed through the body 11A, 11B adjacent to the second end of the body 11A, 11B.

Figure 6:
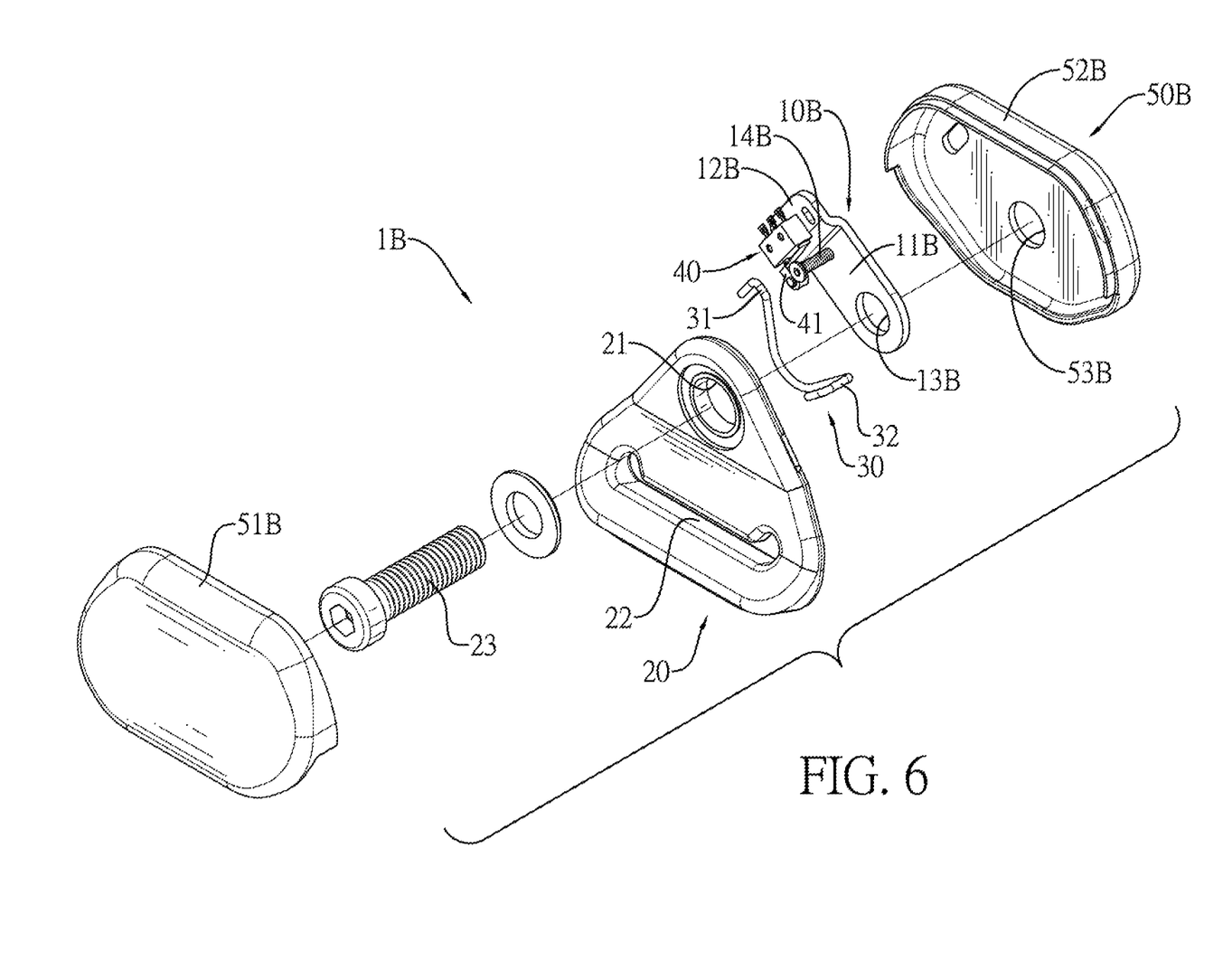
FIG. 6 is an exploded perspective view in partial section of a fourth embodiment of a guide ring sensor in accordance with the present invention.

With reference to FIG. 1, FIGS. 2 to 4, FIG. 5, and FIGS. 6 and 7, the fixing seat 10A, 10B has a positioning portion 14A, 14B. The positioning portion 14A, 14B is mounted on the first end of the body 11A, 11B near the connecting plate 12A, 12B and protrudes out of the front surface of the body 11A, 11B. With reference to FIG. 1, the positioning portion 14A of the fixing seat 10A and the body 11A of the fixing seat 10A are integrated in one piece. The positioning portion 14A of the fixing seat 10A protrudes from the body 11A of the fixing seat 10A and is bent to the front surface of the body 11A. With reference to FIG. 6, the positioning portion 14B of the fixing seat 10B is an independent component, is fixedly mounted on the body 11B of the fixing seat 10B, and extends out of the frond surface of the body 11B.

Figure 2:
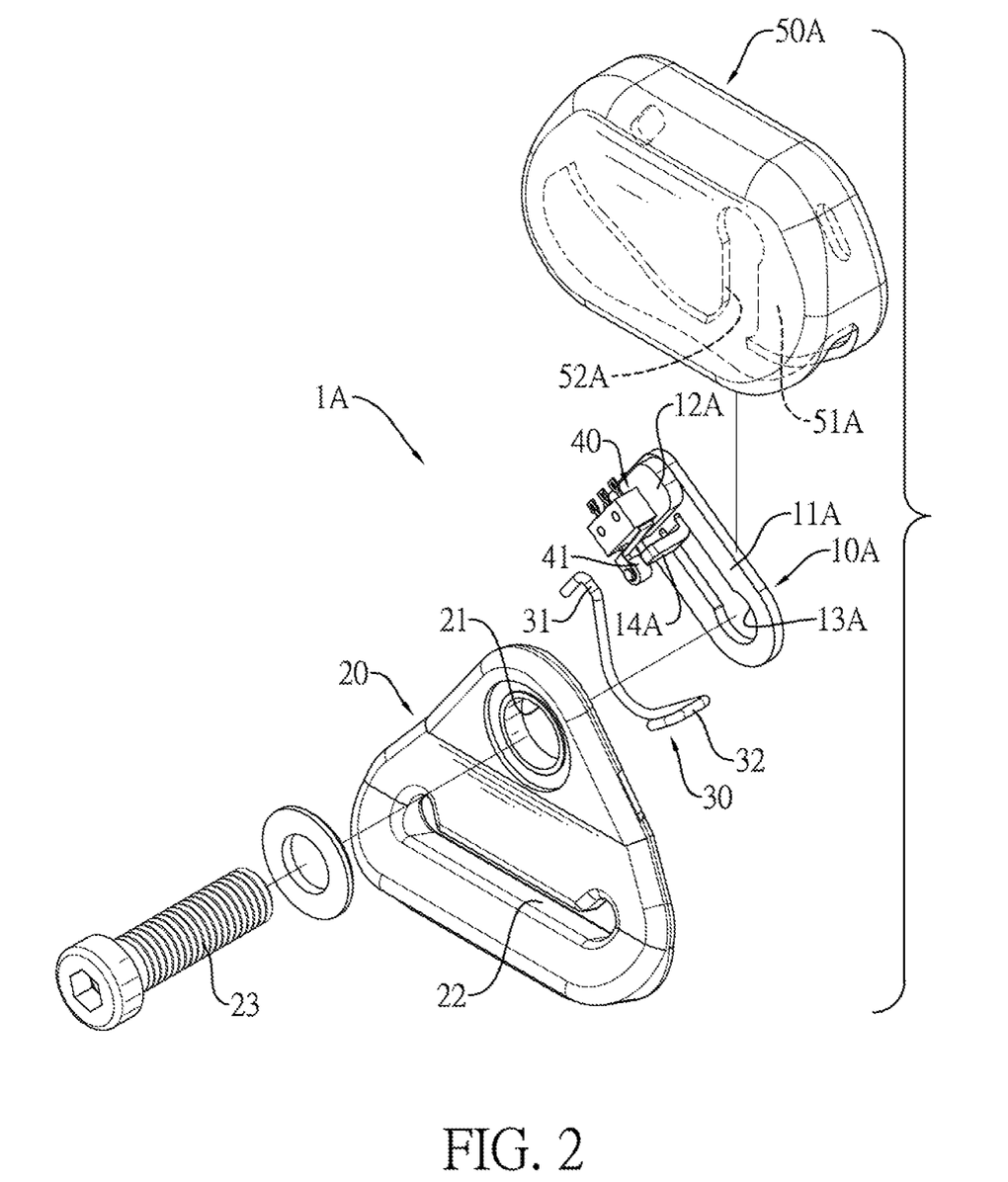
FIG. 2 is an exploded perspective view of a second embodiment of a guide ring sensor in accordance with the present invention.

With reference to FIGS. 1 and 2, the connecting plate 12A is an independent component and is fixedly mounted on the front surface of the body 11A. The connecting plate 12A extends out of the front surface of the body 11A. With reference to FIG. 6, the connecting plate 12B of the fixing seat 10B and the body 11B of the fixing seat 10B are integrated in one piece, and the connecting plate 12B of the fixing seat 10B is bent to and extends out of the front surface of the body 11B.

Figure 8:
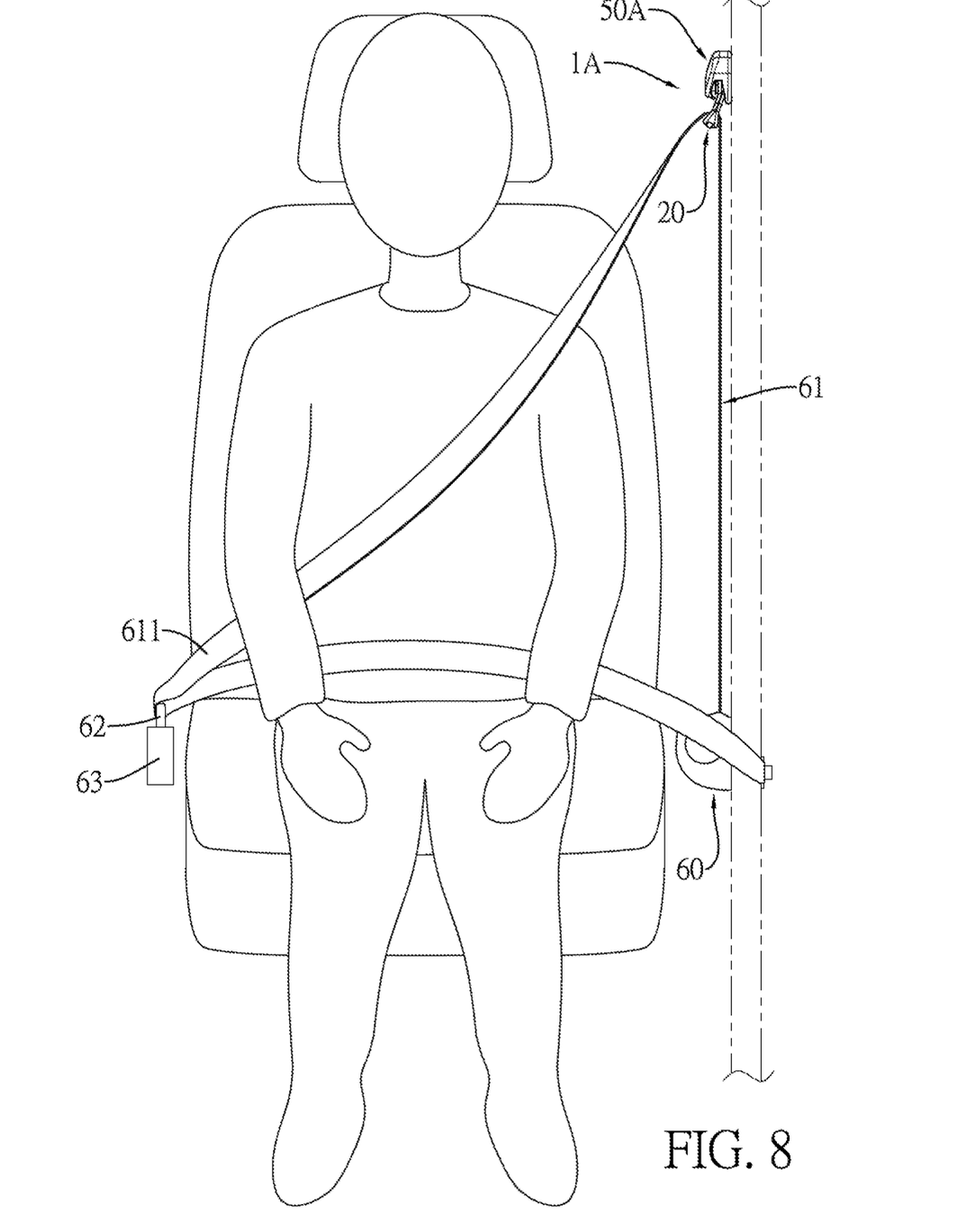
FIG. 8 is an operational front side view of the guide ring sensor in FIG. 2, showing the guide ring sensor is assembled on the seat belt system.

With reference to FIGS. 1, 2, 5, 6, and 9, the guide ring 20 is pivoted on the fixing seat 10A, 10B by a positioning member 23. The guide ring 20 has an upper section, a lower section, a pivot hole 21, and a slot 22. The upper section of the guide ring 20 has a first side surface and a second side surface. The first side surface is formed on the upper section and faces the positioning portion 14A, 14B of the fixing seat 10A, 10B. The second side surface is opposite the first side surface of the upper section. The lower section of the guide ring 20 is deposited below the upper section of the guide ring 20. The pivot hole 21 is formed through the upper section of the guide ring 20. The slot 22 is formed through the lower section of the guide ring 20. The pivot hole 21 of the guide ring 20 is deposited above the slot 22 of the guide ring 20. The positioning member 23 is inserted through the pivot hole 21 of the guide ring 20 and the positioning hole 13A, 13B of the body 11A, 11B, and the guide ring 20 is rotatably mounted on the fixing seat 10A, 10B. The fixing seat 10A, 10B is fixedly mounted in a vehicle by the positioning member 23. A webbing 61 of a seat belt mechanism mounted in the vehicle is inserted through the slot 22 of the guide ring 20. A rear section 611 of the webbing 61 may be pulled to generate an oblique tension. The guide ring 20 may be pivoted on the positioning member 23 by the oblique tension. With reference to FIG. 8, when the oblique tension is released, the webbing 60 may be moved to an initial position.

With reference to FIGS. 1, 2, 5, 6, and 9, the elastic member 30 is rotatably mounted on the body 11A, 11B of the fixing seat 10A, 10B. The elastic member 30 is connected to the guide ring 20 and may provide resilience to the guide ring 20 to restore the guide ring 20. The elastic member 30 has two ends, a positioning part 31, and a motion part 32. The positioning part 31 is formed on one of the two ends of the elastic member 30 and is positioned on the positioning portion 14A, 14B of the fixing seat 10A, 10B. The motion part 32 is formed on the other one of the two ends of the elastic member 30 and is connected to the second side surface of the upper section of the guide ring 20. The elastic member 30 provides resilience to the guide ring 20 to restore the guide ring 20.

Figure 9:
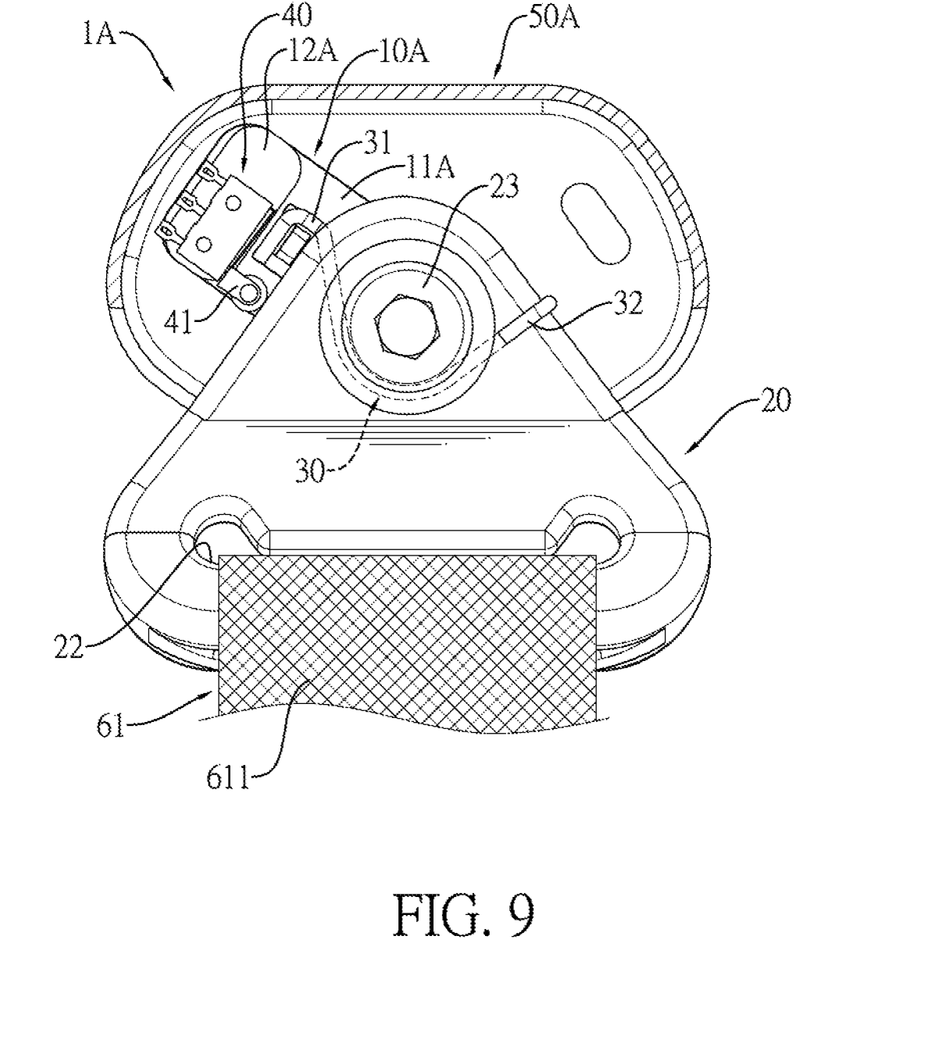
FIG. 9 is an enlarged and operational side view in partial section of the guide ring sensor in FIG. 2, showing a webbing is not fastened.
Figure 10:
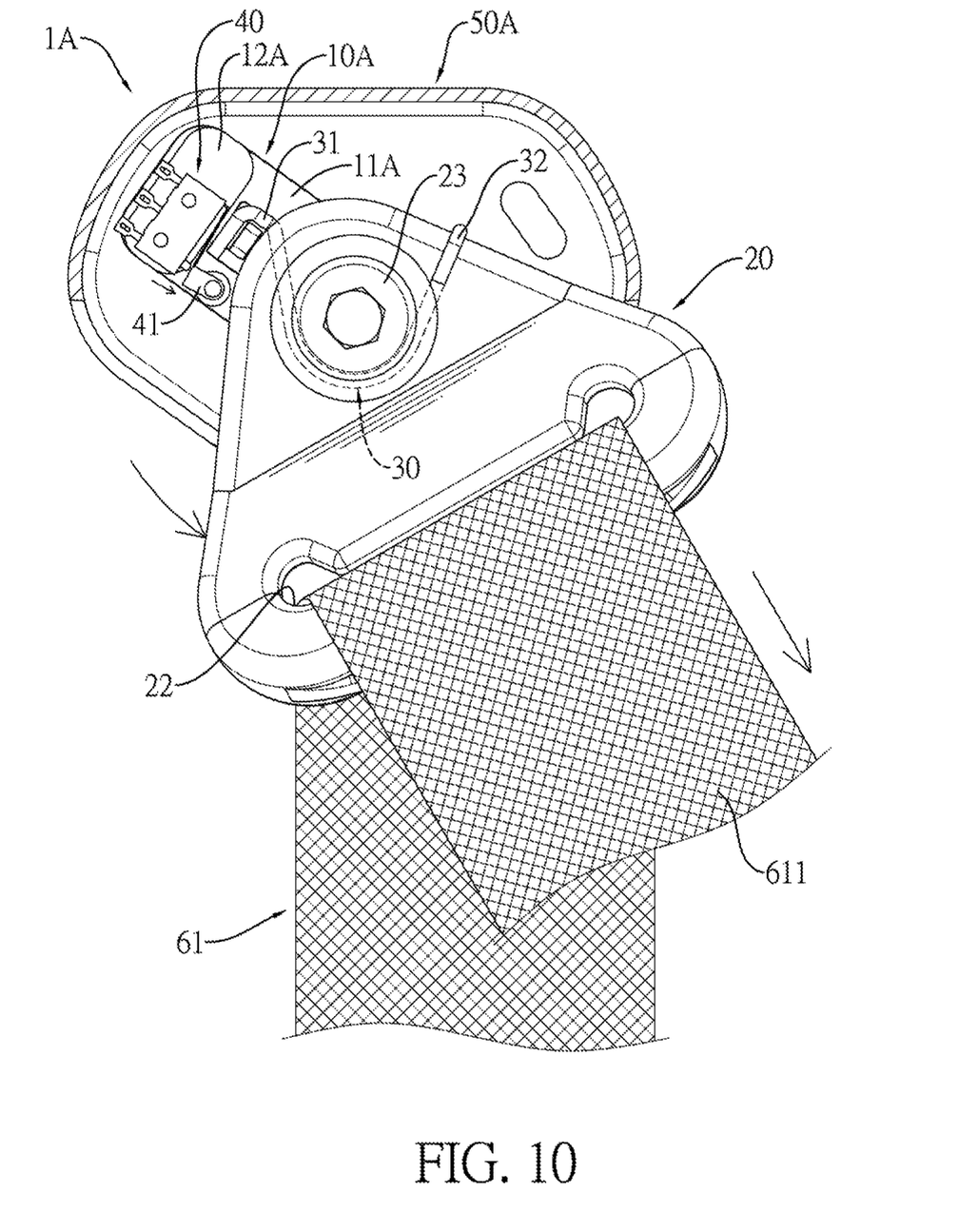
FIG. 10 is another enlarged and operational side view in partial section of the guide ring sensor in FIG. 2, showing the webbing is fastened to drive a guide ring to rotate.

With reference to FIGS. 1, 2, 5, 6, and 9, the sensing element 40 is mounted on the connecting plate 12A, 12B of the fixing seat 10A, 10B. The sensing element 40 has a sensing portion 41. The sensing portion 41 detects a pivoting angle change of the guide ring 20, and the sensing element 40 generates a signal corresponding to the pivoting angle change of the guide ring 20. The sensing element 40 may be a contact sensing element or a non-contact sensing element. The sensing element 40 may be a micro switch belonging to the contact sensing element. The sensing portion 41 of the sensing element 40 is selectively contacted by the guide ring 20 to switch. With reference to FIGS. 9 and 10, when the guide ring 20 is at the initial position by the resilience provided by the elastic member 30, the guide ring 20 contacts the sensing portion 41. When the oblique tension of the webbing 61 is forced on the guide ring 20, the guide ring 20 may be pivoted without contacting the sensing portion 41 to escape a detection range of the sensing element 40. The sensing element 40 is not restricted to the contact sensing element.

Figure 3:
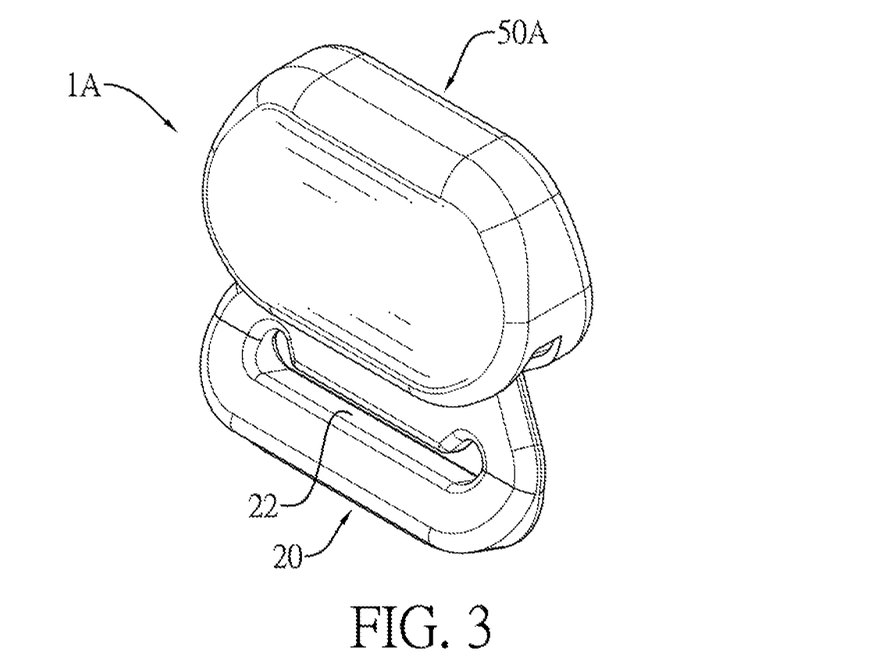
FIG. 3 is a perspective view of the guide ring sensor in FIG. 2.
Figure 4:
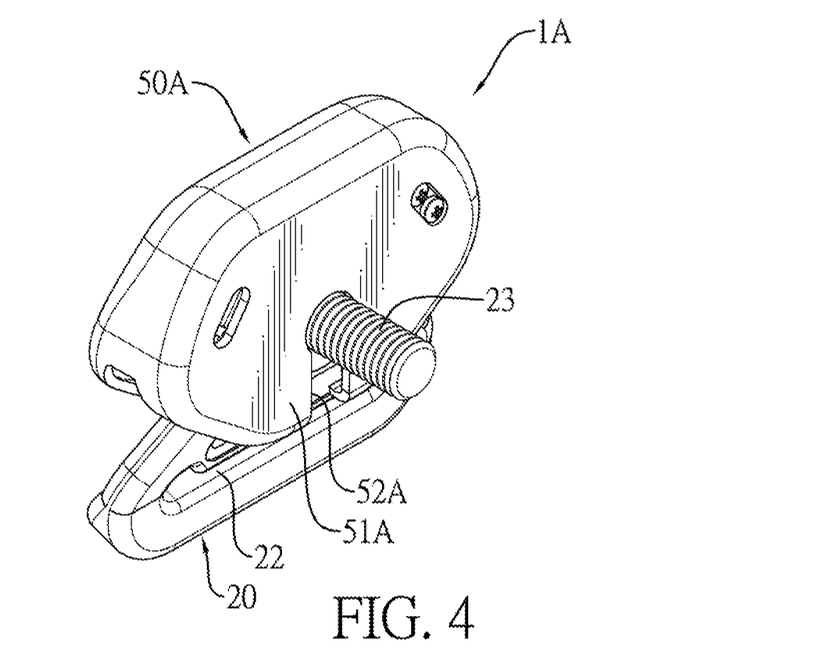
FIG. 4 is another perspective view of the guide ring sensor in FIG. 2.
Figure 7:
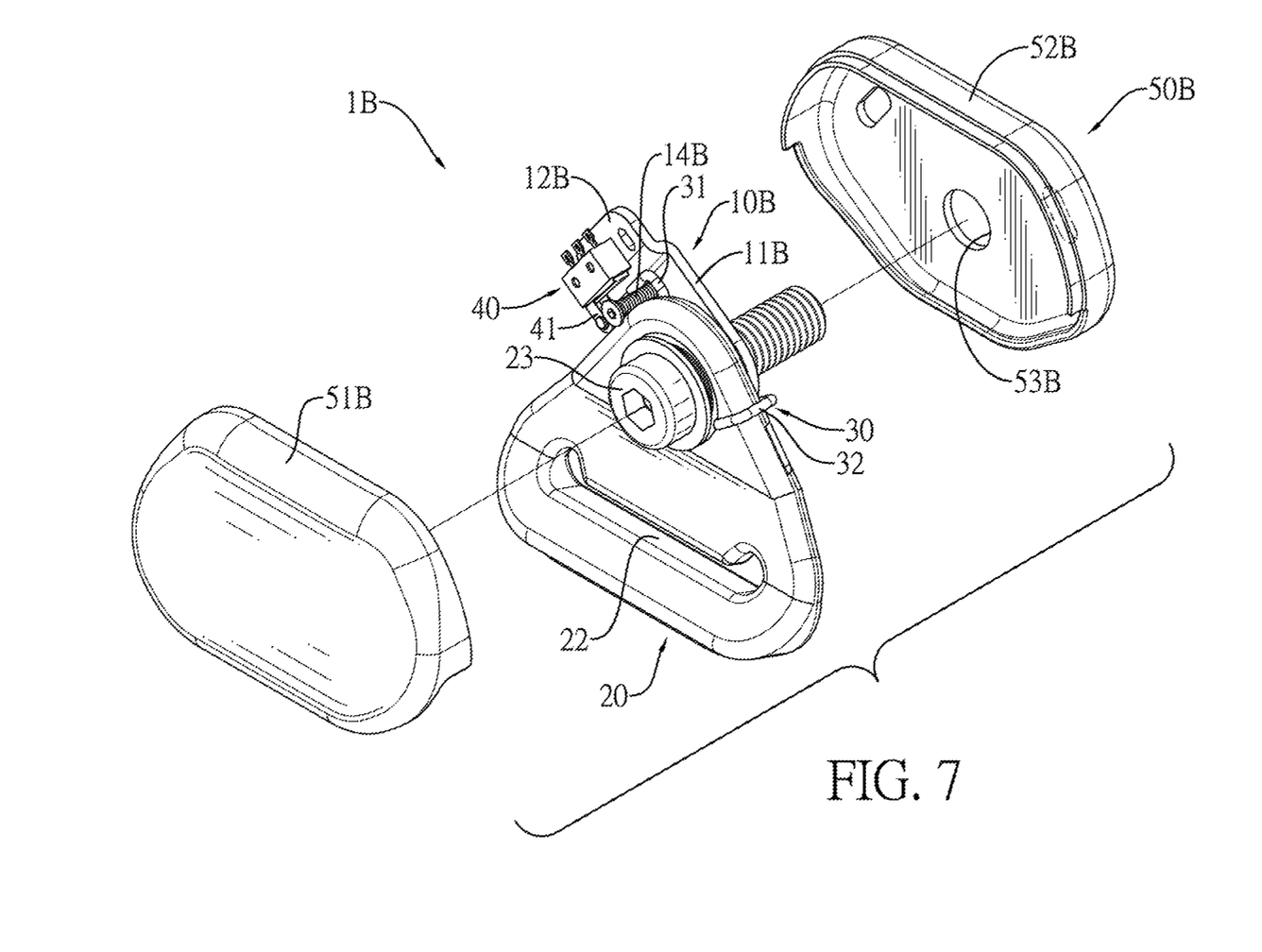
FIG. 7 is another exploded perspective view of the guide ring sensor in FIG. 6.

With reference to FIGS. 2 to 4, FIG. 5, and FIGS. 6 and 7, the shell 50A, 50B is mounted outside and around the fixing seat 10A, 10B, the guide ring 20, the elastic member 30, and the sensing element 40. The shell 50A, 50B has a bottom surface, a rear surface, an activity space, and an opening. The activity space is formed in the shell 50A, 50B. The opening is formed on the bottom surface of the shell 50A, 50B and communicates with the activity space of the shell 50A, 50B. The lower section of the guide ring 20 extends out of the opening of the shell 50A, 50B and is freely moveable. The positioning member 23 is inserted out of the rear surface of the shell 50A, 50B. With reference to FIGS. 1 to 3, the shell 50A is an integrated piece. The shell 50A has a back board 51A and the rear surface of the shell 50A is formed on the back board 51A, and the back board 51A has a bottom edge and an elongated hole 52A. The elongated hole 52A is formed on the bottom edge of the back board 51A and extends upwardly. The elongated hole 52A is in communication with the activity space of the shell 50A. The shell 50A covers the fixing seat 10A, the guide ring 20, the elastic member 30, and the sensing element 40 from top to down. The positioning member 23 is inserted through the elongated hole 52A. With reference to FIGS. 6 and 7, the shell 50B has a front cover 51B and a rear cover 52B. The rear cover 52B is mounted to the front cover 51B. The front cover 51B and the rear cover 52B are located outside the fixing seat 10B, the guide ring 20, the elastic member 30, and the sensing element 40. The shell 50B has a through hole 53B. The through hole 53B is formed through the rear cover 52B and communicates with the activity space of the shell 50B. The positioning member 23 is inserted through the through hole 53B.

With reference to FIGS. 8 and 9, a second embodiment of the guide ring sensor 1A in FIGS. 1 to 3 is applied to a seat belt mechanism in the vehicle. The guide ring sensor 1A is fixedly mounted in the vehicle by the positioning member 23 inserted through the guide ring 20 and the body 11A of the fixing seat 10A. The sensing element 40 is electrically connected to an alarm system in the vehicle. The webbing 61 pulled from a retractor 60 is inserted through the slot 22 of the guide ring 20 of the guide ring sensor 1A. A tongue 62 is mounted on the rear section 611 of the webbing 61.

With reference to FIG. 9, if the driver or any one of the passengers does not fasten a seat belt, the rear section 611 of the webbing 61 is drooped vertically. The webbing 61 does not generate the oblique tension. The resilience provided by the elastic member 30 is forced on the guide ring 20 of the guide ring sensor 1A. The guide ring 20 contacts the sensing portion 41 of the sensing element 40. The sensing element 40 generates the signal to the alarm system. The alarm system generates a warning sound for reminding the driver or the passengers to fasten the seat belt.

Even though the driver or any one of the passengers attempts to pull the webbing 61 passing through a rear side of the torso of the driver or passenger, the webbing 61 does not pass through a front side of the torso of the driver or passenger. The tongue 62 mounted on the rear section 611 is inserted into a seat belt buckle 63. The oblique tension supplied by the webbing 61 is forced on the guide ring 20 and is insufficient. The pivoting angle change of the guide ring 20 is insufficient to lead the guide ring 20 to escape the detection range of the sensing element 40. Therefore, the sensing element 40 still generates the signal to the alarm system. The alarm system generates a warning sound for reminding the driver or the passengers to fasten the seat belt.

With reference to FIGS. 8 and 10, if the driver or the passenger correctly fastens a seat belt, the tongue 62 mounted on the webbing 61 is inserted into the seat belt buckle 63. The webbing 61 obliquely passes through the front side of the torso of the driver or passenger. The oblique tension generated by the rear section 611 of the webbing 61 pulls the guide ring 20 of the guide ring sensor 1A to pivot for an angle until the guide ring 20 escapes the detection range of the sensing element 40. The sensing element 40 generates the signal to the alarm system to stop the warning sound.

Accordingly, the sensing element 40 and the guide ring 20 are combined for directly mounting on a predetermined mounting location for the guide ring in the vehicle and are electrically connected to the alarm system in the vehicle. The pivoting angle of the guide ring 20 may be detected to judge whether the driver or the passengers in the vehicle correctly use the seat belt mechanism or not, and then the guide ring sensor 1A, 1B may cooperate with the alarm system in the vehicle. When the driver or any one of the passengers does not fasten the webbing 61 of the seat belt, it is hard to avoid triggering the alarm system or to restrain a system function by means of inserting an auxiliary tongue into the seat belt buckle 63 or by not passing the webbing 61 through the front side of the torso of the driver or passenger. When the webbing 61 is fastened correctly, the guide ring 20 is pulled by the oblique tension supplied by the webbing 61, and the guide ring 20 is pivoted to escape the detection range of the sensing element 40 for stopping a warning sound of the alarm system or recovering the system function. Therefore, the guide ring sensor 1A, 1B may promote the reliability of the seat belt in use.

What is claimed is:
1. A guide ring sensor comprising:
  a fixing seat having
    a body having
      a front surface;
      a first end of the body formed on the front surface of the body;
      a second end formed on the front surface of the body and being opposite the first end of the body;
    a connecting plate mounted on the first end of the body; and
    a positioning hole formed through the body adjacent to the second end of the body;
  a guide ring pivoted on the fixing seat by a positioning member and having
    an upper section;
    a lower section deposited below the upper section of the guide ring;
    a pivot hole formed through the upper section of the guide ring; and a slot formed through the lower section of the guide ring, wherein the pivot hole of the guide ring is deposited above the slot of the guide ring, the positioning member is inserted through the pivot hole of the guide ring and the positioning hole of the body, and the guide ring is rotatably mounted on the fixing seat;

an elastic member mounted on the body of the fixing seat and connected to the guide ring, wherein the elastic member provides resilience to the guide ring; and a sensing element mounted on the connecting plate of the fixing seat and having a sensing portion, wherein the sensing portion detects a pivoting angle change of the guide ring and the sensing element generates a signal corresponding to the pivoting angle change of the guide ring.

2. The guide ring sensor as claimed in claim 1, wherein the guide ring sensor has a shell mounted outside and around the fixing seat, the guide ring, the elastic member, and the sensing element, and having
a bottom surface;
a rear surface;
an activity space formed in the shell; and
an opening formed on the bottom surface of the shell and communicating with the activity space, wherein the lower section of the guide ring extends out of the opening of the shell and is freely moveable, and the positioning member is inserted out of the rear surface of the shell.

3. The guide ring sensor as claimed in claim 2, wherein the fixing seat has a positioning portion mounted on the first end of the body and protruding out of the front surface of the body;

the upper section of the guide ring has
a first side surface formed on the upper section and facing the positioning portion of the fixing seat; and
a second side surface opposite the first side surface of the upper section; and the elastic member has
two ends;
a positioning part formed on one of the two ends of the elastic member and positioned on the positioning portion of the fixing seat; and
a motion part formed on another of the two ends of the elastic member and connected to the second side surface of the upper section of the guide ring, wherein the elastic member provides resilience to the guide ring.

4. The guide ring sensor as claimed in claim 3, wherein the positioning portion of the fixing seat and the body of the fixing seat are integrated in one piece, and the positioning portion of the fixing seat protrudes from the body of the fixing seat and is bent to the front surface of the body.

5. The guide ring sensor as claimed in claim 3, wherein the positioning portion of the fixing seat is an independent component, is fixedly mounted on the body of the fixing seat, and extends out of the frond surface of the body.

6. The guide ring sensor as claimed in claim 3, wherein the connecting plate is an independent component and is fixedly mounted on the front surface of the body.

7. The guide ring sensor as claimed in claim 4, wherein the connecting plate is an independent component and is fixedly mounted on the front surface of the body.

8. The guide ring sensor as claimed in claim 5, wherein the connecting plate is an independent component and is fixedly mounted on the front surface of the body.

9. The guide ring sensor as claimed in claim 3, wherein the connecting plate of the fixing seat and the body of the fixing seat are integrated in one piece, and the connecting plate of the fixing seat is bent to and extends out of the front surface of the body.

10. The guide ring sensor as claimed in claim 4, wherein the connecting plate of the fixing seat and the body of the fixing seat are integrated in one piece, and the connecting plate of the fixing seat is bent to and extends out of the front surface of the body.

11. The guide ring sensor as claimed in claim 5, wherein the connecting plate of the fixing seat and the body of the fixing seat are integrated in one piece, and the connecting plate of the fixing seat is bent to and extends out of the front surface of the body.

12. The guide ring sensor as claimed in claim 3, wherein the sensing element is a micro switch, and the sensing portion of the sensing element is selectively contacted by the guide ring to switch.

13. The guide ring sensor as claimed in claim 4, wherein the sensing element is a micro switch, and the sensing portion of the sensing element is selectively contacted by the guide ring to switch.

14. The guide ring sensor as claimed in claim 3, wherein the shell is an integrated piece, the shell has a back board and the rear surface of the shell is formed on the back board, and the back board has a bottom edge and an elongated hole, and the elongated hole is formed on the bottom edge of the back board and extends upwardly, and the shell covers the fixing seat, the guide ring, the elastic member, and the sensing element from top to down, and the positioning member is inserted through the elongated hole.

15. The guide ring sensor as claimed in claim 4, wherein the shell is an integrated piece, the shell has a back board and the rear surface of the shell is formed on the back board, and the back board has a bottom edge and an elongated hole, and the elongated hole is formed on the bottom edge of the back board and extends upwardly, and the shell covers the fixing seat, the guide ring, the elastic member, and the sensing element from top to down, and the positioning member is inserted through the elongated hole.

16. The guide ring sensor as claimed in claim 14, wherein the sensing element is a micro switch, and the sensing portion of the sensing element is selectively contacted by the guide ring to switch.

17. The guide ring sensor as claimed in claim 15, wherein the sensing element is a micro switch, and the sensing portion of the sensing element is selectively contacted by the guide ring to switch.

18. The guide ring sensor as claimed in claim 3, wherein the shell has a front cover and a rear cover mounted to the front cover, the front cover and the rear cover are located outside the fixing seat, the guide ring, the elastic member, and the sensing element, the shell has a through hole formed through the rear cover, and the positioning member is inserted through the through hole.

19. The guide ring sensor as claimed in claim 4, wherein the shell has a front cover and a rear cover mounted to the front cover, the front cover and the rear cover are located outside the fixing seat, the guide ring, the elastic member, and the sensing element, the shell has a through hole formed through the rear cover, and the positioning member is inserted through the through hole.

20. The guide ring sensor as claimed in claim 5, wherein the shell has a front cover and a rear cover mounted to the front cover, the front cover and the rear cover are located outside the fixing seat, the guide ring, the elastic member, and the sensing element, the shell has a through hole formed through the rear cover, and the positioning member is inserted through the through hole.

* * * * *